(12) United States Patent
Verho et al.

(10) Patent No.: US 10,597,170 B2
(45) Date of Patent: Mar. 24, 2020

(54) ARRANGEMENT IN CATAPULT

(71) Applicant: Robonic Ltd Oy, Tampere (FI)

(72) Inventors: Heikki Ilmari Verho, Kangasala (FI); Pentti Lipponen, Kangasala (FI)

(73) Assignee: ROBONIC LTD OY, Tampere (FI)

( * ) Notice: Subject to any disclaimer, the term of this patent is extended or adjusted under 35 U.S.C. 154(b) by 468 days.

(21) Appl. No.: 15/426,349

(22) Filed: Feb. 7, 2017

(65) Prior Publication Data

US 2017/0297741 A1    Oct. 19, 2017

(30) Foreign Application Priority Data

Feb. 12, 2016   (GB) .................................. 1602537.1

(51) Int. Cl.
| | | |
|---|---|---|
| *B64F 1/06* | (2006.01) | |
| *F41F 3/04* | (2006.01) | |
| *B64C 39/02* | (2006.01) | |

(52) U.S. Cl.
CPC .............. *B64F 1/06* (2013.01); *F41F 3/0406* (2013.01); *B64C 39/024* (2013.01); *B64C 2201/084* (2013.01)

(58) Field of Classification Search
CPC .............. B64F 1/06; B64F 1/08; F41F 3/0406
See application file for complete search history.

(56) References Cited

U.S. PATENT DOCUMENTS

| | | | |
|---|---|---|---|
| 3,531,065 A | 9/1970 | Brown | |
| 3,631,760 A * | 1/1972 | Moran | ................ F15B 11/076 91/402 |
| 6,457,673 B1 * | 10/2002 | Miller | ....................... B64F 1/06 244/63 |
| 2005/0230533 A1 * | 10/2005 | Lipponen | ................. B64F 1/06 244/63 |

FOREIGN PATENT DOCUMENTS

| | | |
|---|---|---|
| CN | 103277353 A | 9/2013 |
| DE | 33 45 002 A1 | 7/1985 |
| EP | 1 892 187 A1 | 2/2008 |
| GB | 1041810 | 9/1966 |
| WO | 2004/024562 A1 | 3/2004 |

OTHER PUBLICATIONS

European Search Report dated Apr. 28, 2017 for Application No. EP 17 15 4975.
Office Action dated Mar. 17, 2016 for Application No. GB 1602537.1.
Office Action dated Aug. 12, 2016 for Application No. GB 1602537.1.
English abstract of DE 33 45 002 A1.
English abstract of CN 103277353 A.

* cited by examiner

*Primary Examiner* — Richard G Davis
(74) *Attorney, Agent, or Firm* — Ladas & Parry LLP (57) ABSTRACT

The invention relates to a launching cylinder of a catapult and to a catapult. The launching cylinder comprises a frame inside which are a pneumatic pressure space for launching purpose and a hydraulic pressure space for returning purpose. The pressure spaces are separated from each other by means of a piston assembly.

7 Claims, 4 Drawing Sheets

ARRANGEMENT IN CATAPULT

BACKGROUND OF THE INVENTION

The invention relates to a launching cylinder of a catapult. The launching cylinder is used for generating a launching force in order to accelerate an unmanned aircraft and to launch it from the catapult. The launching cylinder is a pressure medium operated actuator and comprises a frame and a piston assembly together with a piston rod.

The invention relates also to a catapult or launching an unmanned aircraft.

The field of the invention is defined more specifically in preambles of independent claims.

A catapult can be used for launching to the air a light unmanned aircraft, such as a drone, a surveillance plane or a missile. The catapult typically comprises a carriage to which the aircraft is connected and which carriage is catapulted at a high speed in such a manner that the aircraft obtains a controlled starting speed and direction for takeoff. The carriage can be moved for instance by means of a pneumatic or hydraulic cylinder, which is connected to act on the carriage by means of a wire or the like. Before being launched, the carriage can be kept in place by means of a locking device. At the same time, a maximum launching force is directed to the carriage. After the launch, the locking device releases the carriage, i.e. the force keeping the carriage in place is suddenly suppressed. The launching force is generated by means of one or more launching cylinders. However, known launching cylinders have shown to contain some problems.

BRIEF DESCRIPTION OF THE INVENTION

The object of the present invention is to achieve a new and improved launching cylinder and a catapult.

The launching cylinder of the invention is characterized by features disclosed in a first independent claim.

The catapult of the invention is characterized by features disclosed in a second independent claim.

An idea of the disclosed solution is that the catapult or launcher comprises one or more launching cylinders for providing a light unmanned aircraft, such as a drone, a surveillance plane or a missile, with rapid accelerating movement on a ramp of the catapult towards a launching direction. The launching cylinder is a pressure medium operated actuator configured to generate launching force needed for the launch. The cylinder comprises a frame inside which is a cylindrical inner space and a piston assembly is arranged movably inside the inner space. The piston assembly is connected to a piston rod, which piston rod is configured to transmit the generated launching force to launching means supported movably to the ramp. Inside the cylindrical inner space of the frame of the cylinder are a first pressure space and a second pressure space, which are separated from each other by means of the piston assembly. The first pressure space serves as a pneumatic pressure space and is connected to a pneumatic circuit for generating the launching force and launching movement towards a stroke direction of the launching cylinder, i.e. towards a launching direction. The second pressure space is located on the side of the piston rod and it serves as a hydraulic pressure space. The hydraulic second pressure space is connected to a hydraulic circuit for generating returning force and movement, the direction of which are towards a return direction, which is opposite to the launching direction. Thus, the launching cylinder is provided with combined pneumatic launching means and hydraulic returning means.

An advantage of the disclosed solution is that the launching cylinder serves as a dual purpose actuator since it is utilized for generating the launching force as well as the returning force. This way, there is no need for any separate returning actuator or device and the structure of the catapult may be compact. Further, weight of the catapult may be decreased.

According to an embodiment the first pressure space of the launching cylinder is connected to a closed pneumatic system, and further, the second pressure space may be connected to a closed hydraulic system. Thus, pressure mediums utilized for the launching and for the returning are both circulated in the closed pressure systems whereby pressure energy is utilized effectively. Thanks to the circulation, efficiency may be high and energy consumption low. Furthermore, closed pneumatic and hydraulic systems allow pressures to recover quickly, whereby operation of the catapult is fast.

According to an embodiment, the piston assembly of the launching cylinder may comprise sealing means or elements. Thus, the piston assembly may comprise radial first sealing means on the side of the first pressure space and radial second sealing means on the side of the second pressure space. The piston assembly is further provided with one or more radial first leakage channels, which are located between the first sealing means and second sealing means. Further, the piston rod may comprise one or more longitudinal second leakage channels first end portions of which are in connection to the first leakage channel allowing thereby leakage fluids to be conveyed through the second leakage channel away from an area between the sealing means of the piston assembly. Thanks to the disclosed leakage channel system pneumatic and hydraulic fluids possibly leaking through the seals may be removed in a controlled manner.

According to an embodiment, the piston rod is an elongated tubular piece comprising an inner space serving as the longitudinal second leakage channel. Thus, in this embodiment there is only one single second leakage channel. The use of the tubular piston rod is inexpensive and convenient solution.

According to an embodiment, the radial first sealing means of the piston assembly comprise two first sealing elements, which are located at a first axial distance from each other. Correspondingly, the radial second sealing means of the piston assembly comprise two second sealing elements, which are located at a second axial distance from each other. Thus, the piston assembly comprises at least four radial sealing elements. Further, the first sealing elements on the pneumatic side may be pneumatic seals and may thereby differ from the hydraulic second sealing elements on the hydraulic side. When double special-purpose sealing elements are used on both end portions of the piston assembly, sufficient and wear resistant sealing may be guaranteed. By means of the efficient sealing system, together with the leakage control system disclosed above, there is in practice no risk of disadvantageous mixing the pneumatic and hydraulic fluids together.

According to an embodiment, the piston assembly comprises an elongated uniform piston frame a first end portion of which is serving as a pneumatic piston and a second end portion of which is serving as a hydraulic piston. Alternatively, there are two separate pistons at an axial distance from each other and leakage means between the pistons.

According to an embodiment, a free end of the piston rod is provided with a first connecting element by means of which the launching movement may be transmitted to a launching system or means of the catapult. The first connecting element comprises an inner space which is in fluid connection with the longitudinal second leakage channel of the piston rod. The first connecting element is further provided with one or more pneumatic discharge ports and one or more hydraulic discharge ports for enabling discharge of pneumatic and hydraulic fluids from the inner space.

According to an embodiment, a free end portion of the piston rod is provided with one or more pneumatic discharge ports and one or more hydraulic discharge ports for enabling discharge of pneumatic and hydraulic fluids from the longitudinal second leakage channel of the piston rod. Thus, this is an alternative solution for the previous embodiment above.

According to an embodiment, the pneumatic discharge port of the first connecting element comprises a breather, or breather valve, which is independently operable and thereby allows automatic discharge of leakage gases.

According to an embodiment, the hydraulic discharge port of the first connecting element comprises a discharge valve for discharging leakage liquid. The discharge valve may be manually controllable and operable.

According to an embodiment, the frame of the launching cylinder comprises a second connecting element at a second end of the launching cylinder and opposite to a first end side of the launching cylinder provided with the first connecting element. The second connecting element is provided with a pneumatic port intended for connecting the first pressure space to the pneumatic circuit.

According to an embodiment, the piston assembly is lubricated inside the pneumatic first pressure space by means of hydraulic fluid remaining on the inner surfaces of the first pressure space due to due to the return direction movement of the launching cylinder. The hydraulic fluid is typically hydraulic oil and serves thereby as good lubricant. Thanks to the slight amount of residual hydraulic oil, resistance against wear of the sealing elements of the pneumatic side of the launching cylinder may be increased.

According to an embodiment, the launching cylinder comprises at least one release valve controlling at least discharge of hydraulic fluid flow from the second pressure space. The release valve may have any suitable structure and control principle. Thus, the release valve may be a spool valve or a rotating valve, for example. Further, the release valve may be operated hydraulically, pneumatically, electrically or mechanically.

According to an embodiment, hydraulic fluid flows are conveyed in both flow directions through the release valve during the work cycle of the launching cylinder. The hydraulic fluid flow towards the second pressure space for generating the return movement is also conveyed through the release valve. Thereby, all the feed and discharge fluid flows of the second pressure space are conveyed through the one single release valve. The greatest opening magnitude of the release valve is however dimensioned according to the relative large volume flow executed during the discharge phase.

According to an embodiment, the release valve is a spring loaded slide valve having two extreme control positions for a slide element. The slide element is forced by means of a spring element to a first control position wherein connection between the second pressure space and the hydraulic circuit is closed. Further, the slide element may be moved to the second control position by directing control pressure to affect on control pressure surfaces of the slide element, so that the slide element opens connection between the second pressure space and the hydraulic circuit. Alternatively, the slide element may be moved by means of an electrical actuator generating the needed control force.

According to an embodiment, the release valve is utilized for controlling the launch of the launch cylinder and movement of the piston assembly and the piston rod towards the launching direction. Thereby, opening and closing of the release valve is controlled for executing the launching. In other words, the release valve may serve as an integrated launching device for the launching cylinder. The release valve may substitute a separate launching lock or device, whereby the structure of the catapult may be simpler. Alternatively, the release valve provided with the integrated controlling feature may be part of the launching control system provided with two or more launching control and safety means. This way, additional safety may be achieved.

According to an embodiment, the release valve of the launching cylinder may serve as a security device for preventing the launch until being opened. When discharge of substantially incompressible hydraulic oil of fluid from the second pressure space of the launching cylinder is prevented, the stroke of the launching cylinder towards the launching direction is prevented. Thus, the launching cylinder comprises a hydraulic launching stopper. In other words, the release valve may serve as an integrated safety device for the launching cylinder.

According to an embodiment, the release valve of the launching cylinder is utilized for controlling accelerating movement of the piston assembly and the piston rod towards the launching direction. Thus, opening and closing of the release valve is controlled for providing the launching cylinder with desired launching dampening features. In other words, the release valve may serve as an integrated launch dampening device or takeoff damper for the launching cylinder. The launch dampening properties of the release valve may be adjusted by controlling the movements of the slide element, or corresponding control element of the valve. By means of the disclosed launch dampening feature creation of acceleration peaks exceeding allowed acceleration limits during the launch may be avoided, thereby ensuring that the launched aircraft is not subjected to excessive accelerations that could damage it. Furthermore, due to the damping, the acceleration stage may also otherwise be more controlled than without the takeoff damping.

According to an embodiment, the release valve of the launching cylinder is utilized for decelerating the movement of the piston assembly and the piston rod before reaching their extreme positions in the launching direction. Thus, opening and closing of the release valve is controlled for providing the launching cylinder with desired end dampening features. In other words, the release valve may serve as an integrated end dampening device for the launching cylinder. The end dampening properties of the release valve may be adjusted by controlling the movements of the slide element, or corresponding control element of the valve. Thanks to the hydraulic end dampening, no mechanical impacts occur between the dynamic and static components of the launching cylinder whereby durability of the structure is increased. Furthermore, the hydraulic end dampening may allow the components to be dimensioned lighter in weight.

According to an embodiment, in connection with the release valve is at least one by-pass channel for providing the launching cylinder with launching or takeoff dampening. The by-pass channel may be furnished with a separate dampening valve. Opening of the dampening valve may be executed prior to opening of the release valve for executing the desired launching dampening.

According to an embodiment, and as an alternative solution to the one comprising end dampening features in connection with the release valve, the end dampening members may be arranged to be located coaxially with the piston rod. Thus, the piston rod or the piston assembly is provided with end dampening surfaces and the frame of the launching cylinder comprises suitable mating surfaces. Then, the dampening surfaces move together with the piston rod in the launching direction after the launch. Before the launching cylinder reaches its outermost end point, the dampening surfaces of the piston rod and the mating surfaces of the frame form together a dampening chamber in front of the dampening surfaces. The dampening surfaces throttle flow of the hydraulic fluid out of the dampening chamber and thereby execute hydraulic end cushioning in the launching direction.

According to an embodiment, the catapult comprises two parallel launching cylinders operation of which cylinders are united and simultaneous. The parallel launching cylinders may be connected to a shared feed conduct of the pneumatic circuit. The launching cylinders may both be connected to own pressure accumulators.

According to an embodiment, the locking means comprises a locking device furnished with at least one locking piece configured to pivot around a joint, and wherein the locking piece comprises at least one connecting member for holding the first carriage when the locking device is in a locking position. The connecting member is configured to release the first carriage when the locking piece is turned towards the launching direction by a predetermined angle position. Alternatively, or in addition to, the at least one launching cylinder comprises hydraulic locking means.

According to an embodiment, the dampening means are integrated to be part of the at least one launching cylinder. Thereby, the dampening is executed hydraulically.

According to an embodiment, the at least one launching cylinder of the catapult comprises a pneumatic first pressure space connected to a pneumatic circuit and configured to generate the launching movement, and further, a hydraulic second pressure space connected to a hydraulic circuit and configured to generate the returning movement. Connection from the hydraulic second pressure space is openable and closable to the hydraulic circuit by means of at least one release valve. Further, the hydraulic circuit comprises one or more hydraulic fluid storages for receiving volume flow of the pressurized hydraulic fluid discharged from the second pressure space during the launching movement.

According to an embodiment, the hydraulic fluid storage is a hydraulic pressure accumulator comprising a hydraulic space for receiving the hydraulic volume flow and a gas space provided with pre-charge pressure.

According to an embodiment, the hydraulic fluid storage is a hydraulic fluid tank. A discharge channel connecting the tank to the hydraulic system is provided with at least one valve element serving as a non-return valve and preventing the hydraulic fluid from flowing from the tank towards the launching cylinder.

According to an embodiment, the hydraulic fluid tank is provided with at least one flow control unit for guiding the discharged volume flow of the discharge channel towards a bottom part of the tank. The flow control unit may comprise one or more control surfaces, which are arranged in an angular position relative to a direction of the flow of the discharge channel whereby the control surfaces are able to change the direction of the hydraulic discharge flow. The tank may also be furnished with one or more perforated plates, which are located at suitable distances from the bottom of the tank. The flow control unit and the perforated plates both serve as stabilizing elements and allow extremely large and momentary volume flow to be discharged to the tank. Further, an uppermost part of the tank may comprise one or more breather elements allowing gases to be discharged from the tank.

The above disclosed embodiments and features may be combined for generating suitable combinations and solutions.

BRIEF DESCRIPTION OF THE FIGURES

The disclosed solution will be described in more detail in the accompanying drawings, in which.

For the sake of clarity, the figures show the invention in a simplified manner. In the figures, similar parts are denoted by the same reference numerals.

DETAILED DESCRIPTION OF SOME EMBODIMENTS

Figure 1:
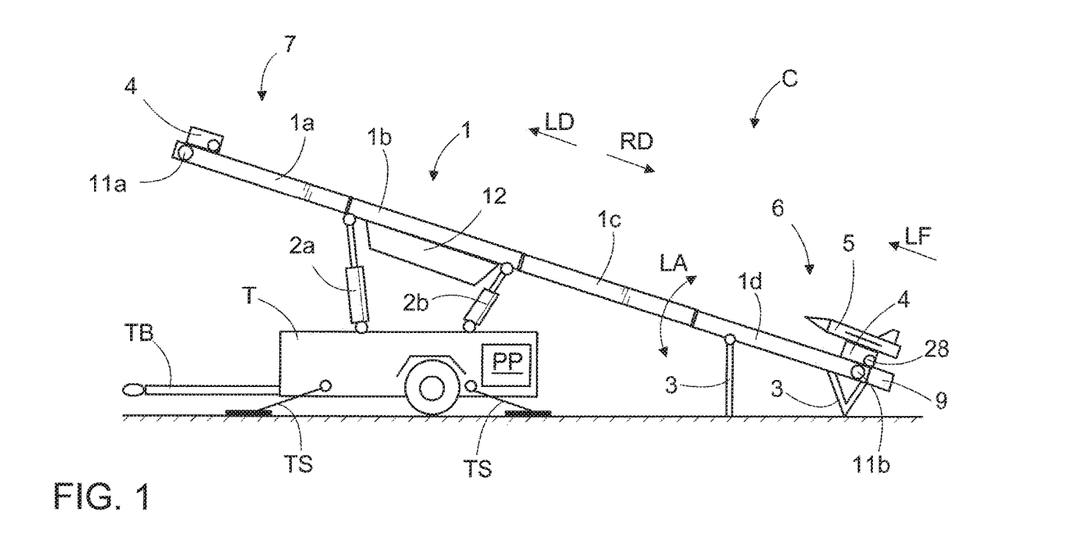
FIG. 1 is a schematic side view of a catapult arranged on a movable carrier, FIG. 2 schematically shows the principle of a launching apparatus.

FIG. 1 shows a catapult C in a launching position. The catapult C comprises an elongated body or ramp 1 which may be composed of several ramp portions 1a to 1d, which may be folded to a transport and storage position. The ramp 1 can be lifted and lowered for instance with hydraulic cylinders 2a and 2b so as to achieve the desired launching angle LA. In addition, the ramp 1 may be supported with a suitable number of supports 3 to the ground or other support surface. The ramp 1 and assisting means and systems may be connected to mobile carrier T, such as a trailer, which may be equipped with a tow bar TB, stabilizers TS and one or more power packs PP and devices for generating needed electric, pneumatic and hydraulic energy. The catapult C may further comprise a carriage 4 having fastening members for fastening an aircraft 5. The carriage 4 may be supported on guiding surfaces or corresponding support surfaces provided on the ramp 1 by means of rollers, slide blocks or corresponding members. In the portion of a first end of the ramp 1 is provided a launching position 6 and in the portion of a second end is provided a releasing position 7. The carriage 4 is movable with high acceleration from the launching position 6 to the releasing position 7, where the aircraft 5 is released from the carriage and takes off. The aircraft 5 may be released from the carriage 4 at the second end of the ramp 1 or well before the carriage 4 reaches the second end of the body 1. After the launch, the carriage 4 is returned to the launching position 6 for a new launch. Launching force LF required in the launch may be generated by means of a launching device 12, which comprises one or more launching cylinders and means for transmitting the generated launch force to the carriage 4. FIG. 1 does not show the launching device in its entirety for the sake of clarity.

Furthermore, the launching position 6 is provided with a locking device 9, which is able to hold the carriage 4 until the launching moment. In the locking position, the locking device 9 is able to receive the launching force LF directed to the carriage 4 and it may release the carriage 4 after the launch, whereby the carriage 4 accelerates at a high speed towards the releasing position 7. Accordingly, the catapult C is used to provide the aircraft 5 with an as high takeoff speed as possible in a short distance. In principle, the aircraft 5 may be any relatively light unmanned aircraft, which may be provided with a propulsion device, such as an airscrew, jet engine or rocket engine. Furthermore, the aircraft 5 may comprise ailerons or other control members for controlling it with remote control or automatically by means of a control system in the aircraft 5. It is further mentioned that the catapult C may alternatively be installed fixedly at a launching site or it may be connected to a movable base, such as a ship.

Figure 2:
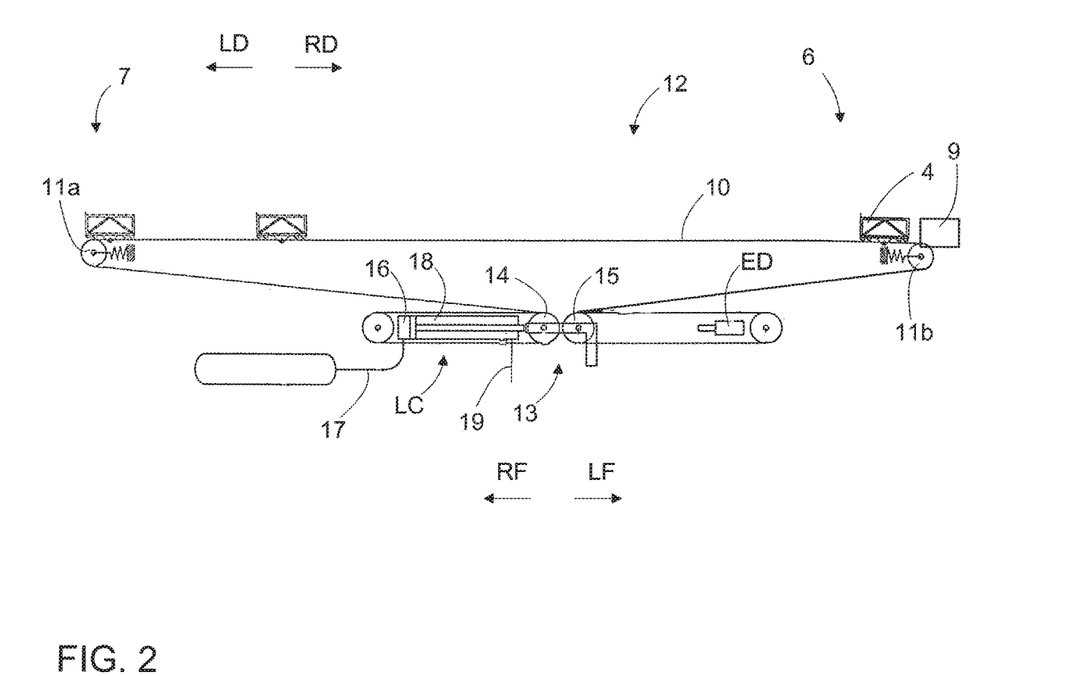

FIG. 2 shows in a strongly simplified manner a launching device 12 with which the required launching force LF can be generated. For the sake of clarity, the aircraft 5 and the ramp 1 are not shown at all. In the situation of FIG. 2, the carriage 4 is in the launching position 6, where it is kept immobile by means of a locking device 9. One or more pulling members 10, e.g. a wire arranged to pass around idler wheels 11a and 11b, are connected to the carriage 4. The pulling member 10 may also be some other pull-resistant flexible power transmission member, such as a cord, band or chain. The carriage 4 is movable from the launching position 6 to the releasing position 7 and vice versa by pulling the pulling member 10 either in the launching direction LD or in the returning direction RD. The launching force LF required by the launch can be generated in the pulling member 10 by means of a launching cylinder LC. The launching cylinder LC is a pressure medium operated cylinder, which may be arranged to generate the launching force LF in the pulling member 10 by means of a tackle mechanism 13. In this case, the launching cylinder LC may be arranged to move tackle pulleys 14 and 15 comprised by the tackle mechanism 13. For the launch, the carriage 4 is locked by means of the locking device 9 to the launching position 6, and the desired pulling force is generated in the pulling member 10 by a stroke of the launching cylinder LC. The launching cylinder LC is provided with a pneumatic first pressure space 16 connected to a pneumatic circuit 17 in order to generate the launching force LF. Further, the launching cylinder LC comprises a hydraulic second pressure space 18 for generating returning force RF, whereby no separate returning device is needed. FIG. 2 further shows an end damper ED or stopping damper, which is able to stop the launching mechanism when the carriage 4 has reached the releasing position 7. The end damper ED may alternatively be integrated to be part of the launching cylinder LC whereby no separate actuator is needed.

Figure 3:
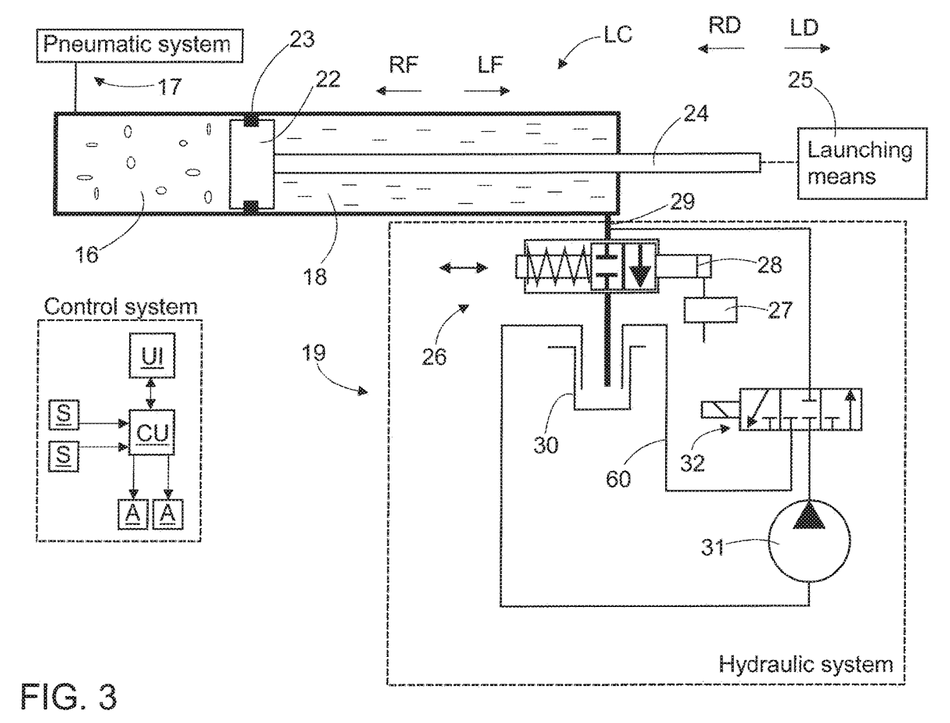
FIG. 3 is a schematic view of a launching cylinder and pressure medium systems being connected to the cylinder, FIG. 4 a schematic view of an alternative launching cylinder, which is connected to a hydraulic pressure accumulator.

FIG. 3 discloses a launching cylinder LC, which comprises a frame 20 inside which is a cylindrical inner space 21. The inner space 21 is divided by means of a piston assembly 22 to two pressure spaces, namely to a pneumatic first pressure space 16 and to a hydraulic second pressure space 18. The first pressure space 16 is connected to a pneumatic circuit 17 or system, and correspondingly the second pressure space 18 is connected to a hydraulic circuit 19 or system. The piston assembly 22 comprises sealing elements 23 and is connected to a piston rod 24. The piston rod 24 moves together with the piston assembly 22 and transmits generated movements further to launching means 25 or launching members. Launching force LF is generated by means of the pneumatic first pressure space 16 and returning force RF is generated by the hydraulic second pressure space. When the launching cylinder LC is launched, hydraulic fluid is discharged from the second pressure space through a release valve 26, which may be controlled by directing a control pressure through a control valve 27 to a control spool 28 of the valve. In FIG. 3 the release valve 26 is closed and can be opened by moving a control slide of the valve to the left. The control slide or element may be spring loaded so that when control pressure is not effective, then the release valve 26 will be automatically closed. The release valve 26 may alternatively be electrically controlled or may be moved manually. The release valve 26 is connected to a discharge channel 29. An inner area of cross section of the discharge channel 29 or tube is dimensioned to be relatively large because magnitude of the discharged hydraulic fluid flow is great during the launch. In FIGS. 3-7 this is indicated by using thicker lines. An outermost end of the discharge channel 29 is connected to a hydraulic fluid tank 30 or reservoir. The hydraulic circuit 19 further comprises a hydraulic pump 31 or other pressure source for feeding pressurized hydraulic fluid through a valve 32 to the feed port of the second pressure space 18. Hydraulic fluid is fed to the second pressure space 18 in order to move the piston assembly 22 towards a return direction RD. The valve 32 may also be used for releasing hydraulic pressure in a controlled manner out of the hydraulic pressure space in case of failure in the launching system, for example. Then the valve 32 let the hydraulic flow to flow through a channel 60 to the tank 30.

FIG. 3 further discloses a control system comprising a control unit CU, which may be computer or other suitable control device. The control unit CU communicates with one or more user interfaces UI and receives data from one or more sensors S. Based on control commands and data inputted by means of the user interface and data received from the sensors the control unit CU generates control commands for one or more actuators A. The actuators A may be control valves, for example.

Let it be mentioned that the pneumatic system may comprise one or more pneumatic pressure accumulators, one or more control valves and at least one compressor or other pressure source.

Figure 4:
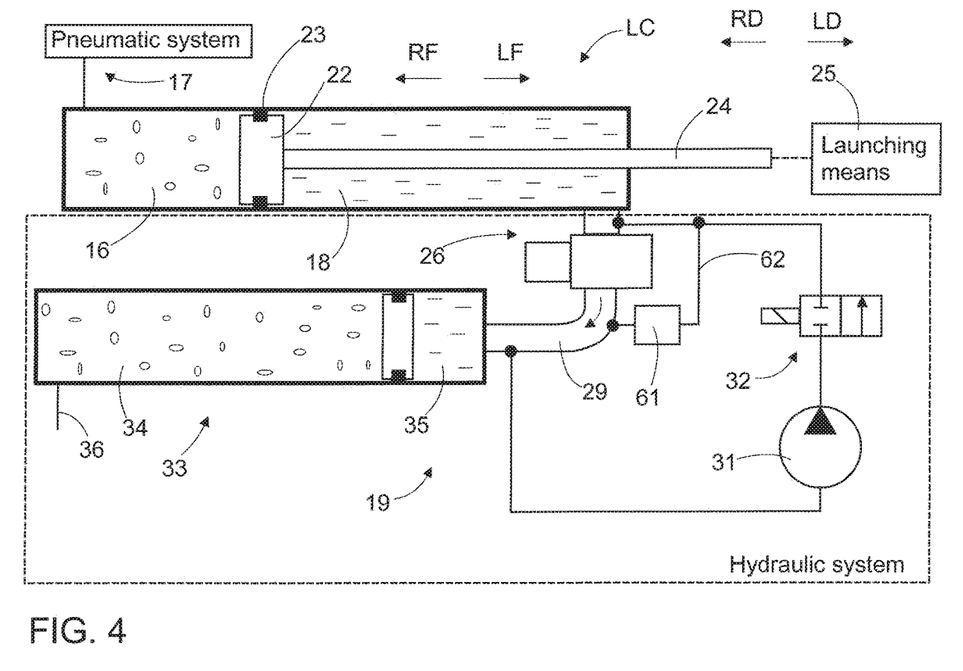

FIG. 4 discloses a launching cylinder LC which is connected to a hydraulic system provided with a hydraulic pressure accumulator 33. Thus, comparing the system of FIG. 4 to the system of FIG. 3, the hydraulic tank 30 is substituted by the accumulator 33. The pressure accumulator 33 may be a piston accumulator or it may comprise a diaphragm for separating a gas space 34 and a liquid space 35. The gas space 34 may be provided with pre-charge pressure fed through a feed port 36.

FIG. 4 further discloses a feasible additional valve 61 for allowing hydraulic fluid to be released in a controlled manner to the accumulator in case of a failure in the launching system or in case the launching is cancelled. The valve 61 is connected to a channel 62.

In FIG. 3 the release valve 26 may be controlled to open in a desired manner for controlling accelerating movement of the piston assembly 22. FIG. 4 shows an alternative solution wherein in connection with the release valve 26 is a by-pass channel 37 and a separate dampening valve 38 connected to the by-pass channel. The desired movement dampening may be executed by controlling the separate dampening valve 38.

Figure 5:
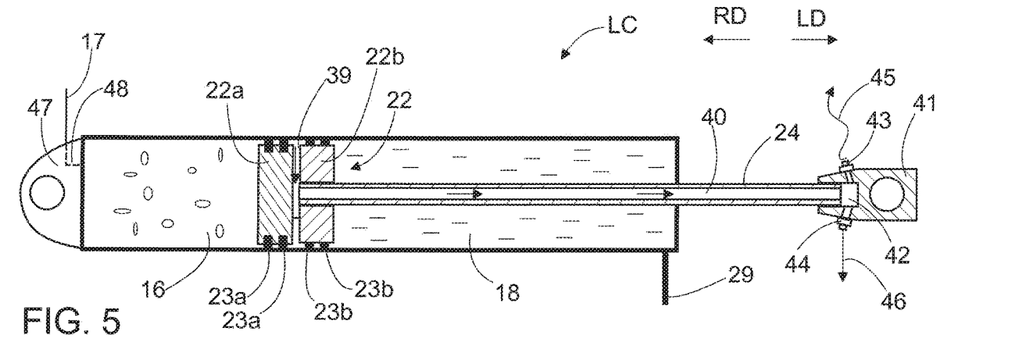
FIG. 5 is a schematic side view of a launching cylinder and its two piece piston which is connected to a fluid leakage removal system.

FIG. 5 discloses a launching cylinder LC provided with fluid leakage removal system, which comprises one or more radial first leakage channels 39 in the piston assembly 22 and one or more axial second leakage channels 40 in a piston rod 24. The piston assembly 22 may comprise a pneumatic piston 22a and hydraulic piston 22b between which the first leakage channel 39 is located. The pneumatic piston 22a is provided with one or more pneumatic sealing elements 23a and the hydraulic piston 22b is provided with one or more hydraulic sealing elements 23b. In case the gas or the liquid penetrates through the sealing elements 23a, 23b the leakage fluids are conveyed through the leakage channels 39 and 40 away form an inner space of the launching cylinder LC. As can be noted, the piston rod 24 may be a tubular piece. At a distal end of the piston rod 24 may be a first connecting element 41 for transmitting the generated forces to the launching system. The first connecting element 41 may comprise an inner space 42 which may receive the leakage fluid flow. Further, the first connecting element 41 may be furnished with a pneumatic discharge port 43 or a breather, and also with a hydraulic discharge port 44. Thus, the discharge ports 43 and 44 enable discharge of pneumatic fluid 45 and hydraulic fluid 46. At an opposite end of the launching cylinder LC may be a second connecting element 47. The second connecting element 47 may comprise a pneumatic channel 48 for connecting the pneumatic pressure space 16 to a pneumatic circuit 17.

Figure 6:
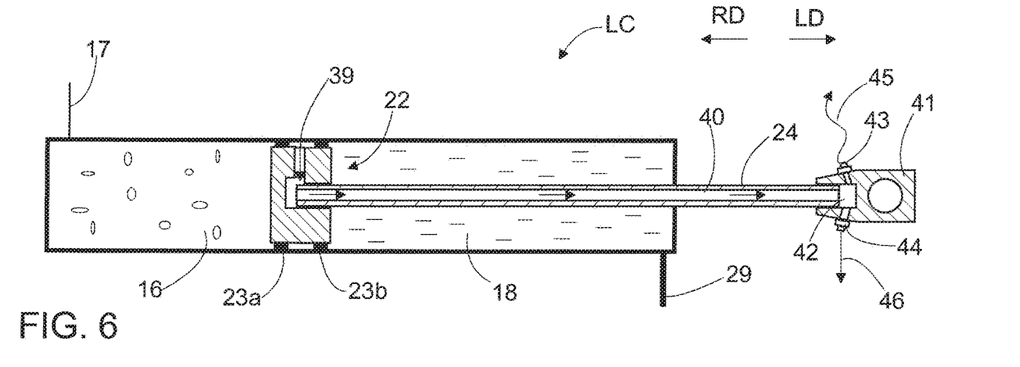
FIG. 6 is a schematic side view of a launching cylinder and its one piece piston which is provided with radial leakage channels being connected to a fluid leakage removal system.

FIG. 6 discloses a launching cylinder LC, which differs from the one shown in the previous FIG. 5 in that the piston assembly 22 comprises one piece piston. The piston comprises one or more pneumatic sealing elements 23a and one or more hydraulic sealing elements 23b. Between the sealing elements 23a and 23b is one or more radial first leakage channels 39. The leakage channels 39 may be bores, for example.

Figure 7:
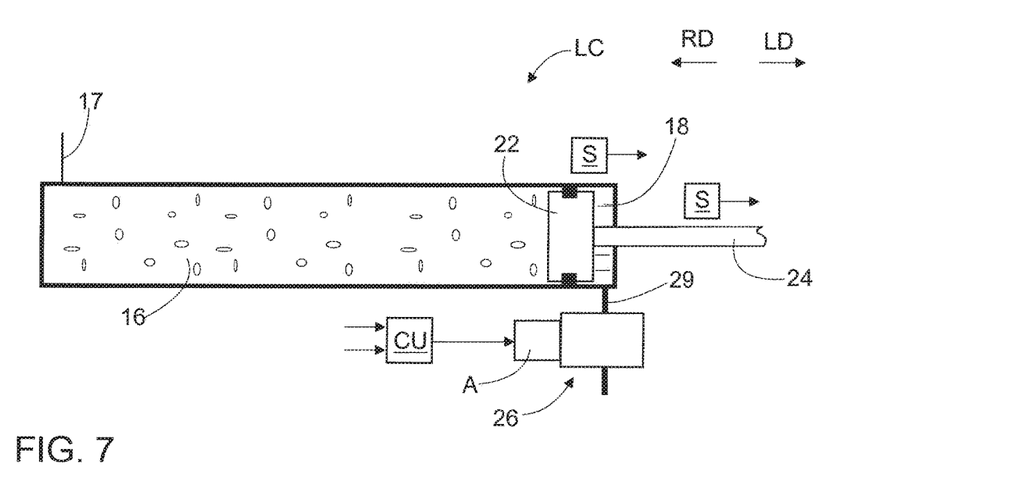
FIG. 7 is a schematic side view of a launching cylinder equipped with a release valve which is controlled for providing the cylinder with hydraulic end cushioning.

FIG. 7 discloses a launching cylinder LC equipped with a release valve 26 which is controlled for providing the cylinder with hydraulic end cushioning at an extreme end portion of a movement range. Movement of a piston assembly 22, piston rod 24 or any other suitable component of a catapult may be measured or determined by means of one or more sensors S. Sensing data of the sensors S may be transmitted to a control unit CU, which may control an actuator A for controlling opening and closing of the release valve 26. This way, it is possible to detect when the launching cylinder LC is reaching its extreme position and to close the release valve 26 before the piston assembly 22 collides with an end surface of a frame.

Figures 8A, 8B:
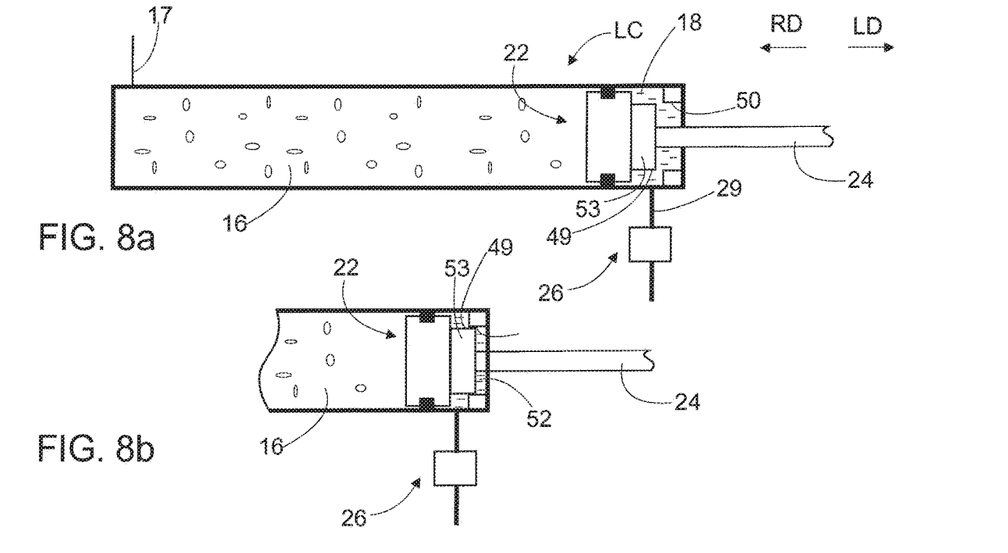
FIGS. 8a and 8b are schematic side views of a launching cylinder comprising a piston which is provided with end dampening surfaces which in cooperation with mating surfaces arranged in a frame form a dampening chamber for the cylinder.

FIGS. 8a and 8b show a launching cylinder LC comprising a piston assembly 22 which is provided with end dampening surfaces 49 which may together with mating surfaces 50 arranged in a frame form a dampening chamber 51 when the piston assembly 22 reaches its extreme end position. FIG. 8b clearly indicates that a closed pressures space 52 is formed when a collar 53 of the piston assembly 22 closes a space defined by the mating surfaces 50 and an end wall of the cylinder.

Figure 9:
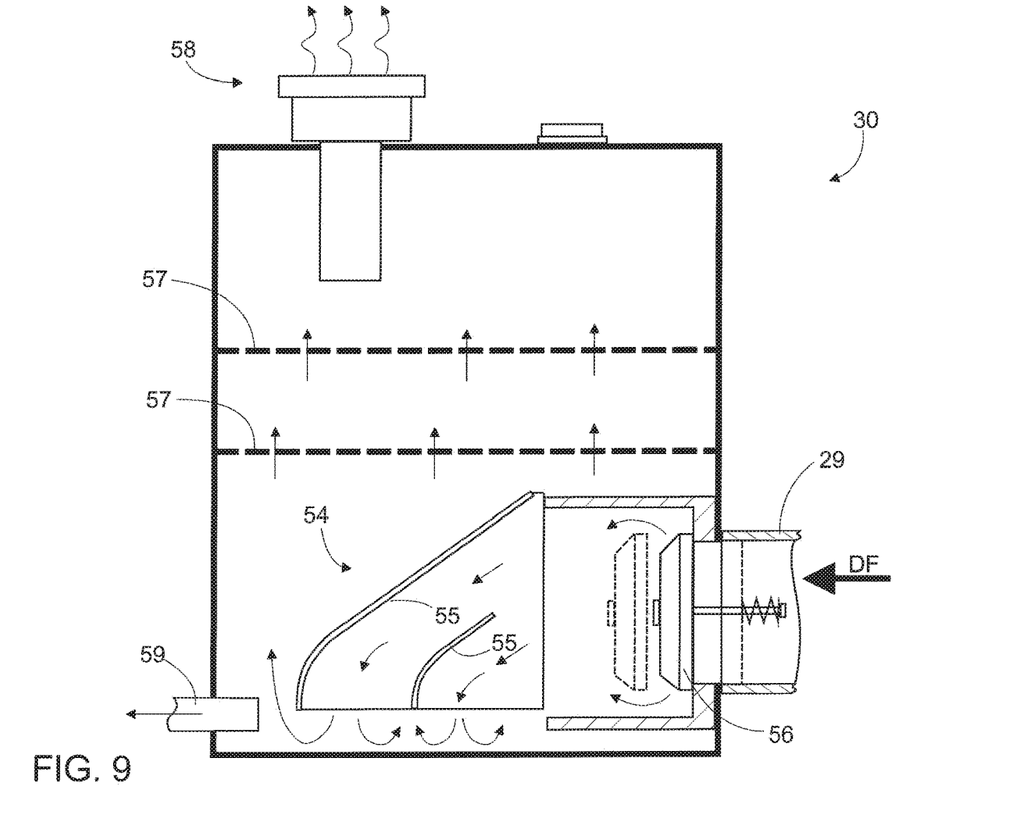
FIG. 9 is a schematic side view of a hydraulic fluid tank provided with means for controlling hydraulic fluid flow discharged from a launching cylinder during a launch of a catapult.

FIG. 9 discloses a hydraulic fluid tank 30 provided with means for controlling hydraulic fluid flow discharged from a launching cylinder during a launch of a catapult. A discharge channel 29 is connected to a lower portion of the tank 30. The discharged flow DF is directed towards a bottom of the tank 30 by means of a flow control unit 54 comprising control surfaces 55. The flow control unit 54 may also comprise a valve element 56 allowing the discharge flow DF to flow towards the tank and preventing fluids from flowing in an opposite direction. Furthermore, the tank 30 may comprise one or several perforated plates 57 arranged inside the tank 30. An upper portion of the tank 30 may comprises a breather 58 for releasing gases out of the tank 30. The tank 30 further comprises a suction channel 59 through which hydraulic fluid may be conveyed to a hydraulic pump. The hydraulic fluid may be configured to circulate in a closed hydraulic system.

The drawings and the related description are only intended to illustrate the idea of the invention. The details of the invention may vary within the scope of the claims.

The invention claimed is:

1. A launching cylinder of a catapult wherein the launching cylinder comprises:
    a frame comprising a cylindrical inner space;
    a piston assembly arranged movably inside the inner space and being connected to a piston rod;
    a first pressure space and a second pressure space inside the cylindrical inner space of the frame and being separated from each other by means of the piston assembly;
    and wherein the first pressure space is connectable to a pneumatic circuit for generating launching movement towards a stroke direction of the launching cylinder, and the second pressure space on the side of the piston rod is connectable to a hydraulic circuit for generating return movement opposite to the stroke direction, whereby the launching cylinder is provided with combined pneumatic launching means and hydraulic returning means.

2. The launching cylinder as claimed in claim 1, wherein the piston assembly comprises radial first sealing means on the side of the first pressure space and radial second sealing means on the side of the second pressure space;
    the piston assembly is further provided with at least one radial first leakage channel, which is located between the first sealing means and second sealing means;
    and the piston rod comprises at least one longitudinal second leakage channel a first end portion of which is in connection to the first leakage channel allowing thereby leakage fluids to be conveyed through the second leakage channel away from an area between the sealing means of the piston assembly.

3. The launching cylinder as claimed in claim 2, wherein a free end of the piston rod is provided with a first connecting element by means of which the launching movement is transmittable to a launching system of the catapult;
    the first connecting element comprises an inner space which is in fluid connection with the longitudinal second leakage channel of the piston rod;
    and the first connecting element is further provided with at least one pneumatic discharge port and at least one hydraulic discharge port for enabling discharge of pneumatic and hydraulic fluids from the inner space.

4. The launching cylinder as claimed in claim 1, wherein the piston assembly is lubricated inside the pneumatic first pressure space by means of hydraulic fluid remaining on the inner surfaces of the first pressure space due to the return direction movement of the launching cylinder.

5. The launching cylinder as claimed in claim 1, wherein the launching cylinder comprises at least one release valve controlling at least discharge of hydraulic fluid flow from the second pressure space.

6. A catapult for launching an unmanned aircraft, which catapult comprises at least:
- an elongated ramp;
- a carriage supported to the ramp and being movable in the longitudinal direction of the ramp from a launch position to a release position and back, and which carriage comprises coupling members for supporting the aircraft;
- a tackle mechanism that is also supported to the ramp and is movable in the longitudinal direction of the ramp;
- at least one pressure-medium-operated launching cylinder configured to move the tackle mechanism for generating launching movement in launching direction;
- at least one pulley mechanism that comprises at least one pulley and is arranged in connection with the tackle mechanism;
- at least one pulling element that is engaged with the carriage and the ramp and is further configured to run via at least one launch-side pulley mechanism and to transmit the motion of the tackle mechanism to the carriage for moving the carriage from the launch position to the release position;
- locking means for keeping the first carriage at the launching position and for releasing it at a launching moment;
- damping means for affecting accelerating and decelerating movements of the first carriage in the launching direction;
- and at least one launching cylinder according to claim 1 further configured to return the first carriage from the release position to the launch position.

7. The catapult as claimed in claim 6, wherein
- the at least one launching cylinder comprises the first pressure space connected to the pneumatic circuit and configured to generate the launching movement, and the second pressure space is connected to the hydraulic circuit and configured to generate the returning movement;
- connection from the second pressure space is openable and closable to the hydraulic circuit by means of at least one release valve;
- and the hydraulic circuit comprises at least one hydraulic fluid storage for receiving volume flow of the pressurized hydraulic fluid discharged from the second pressure space during the launching movement.

\* \* \* \* \*